(12) United States Patent
De Laet et al.

(10) Patent No.: US 12,716,498 B2
(45) Date of Patent: Aug. 25, 2026

(54) ASSEMBLY HAVING TWO COMPONENTS AND AN OIL TRANSFER RING

(71) Applicants: ZF FRIEDRICHSHAFEN AG, Friedrichshafen (DE); ZF Wind Power Antwerpen N.V., Lommel (BE)

(72) Inventors: Wim De Laet, Antwerp (BE); Stijn Rottiers, Lokeren (BE); Andy Maes, Sinaai (BE); Sonja Goris, Berlaar (BE)

(73) Assignees: ZF FRIEDRICHSHAFEN AG, Friedrichshafen (DE); ZF WIND POWER ANTWERPEN N.V., Lommel (BE)

( * ) Notice: Subject to any disclaimer, the term of this patent is extended or adjusted under 35 U.S.C. 154(b) by 0 days.

(21) Appl. No.: 18/698,044

(22) PCT Filed: Oct. 10, 2022

(86) PCT No.: PCT/EP2022/078015
§ 371 (c)(1),
(2) Date: Apr. 3, 2024

(87) PCT Pub. No.: WO2023/083535
PCT Pub. Date: May 19, 2023

(65) Prior Publication Data

US 2025/0198516 A1 Jun. 19, 2025

(30) Foreign Application Priority Data

Nov. 12, 2021 (DE) ..................... 10 2021 212 743.6

(51) Int. Cl.
*F16J 15/3236* (2016.01)
*F16H 57/029* (2012.01)
*F16H 57/04* (2010.01)

(52) U.S. Cl.
CPC ........ *F16J 15/3236* (2013.01); *F16H 57/029* (2013.01); *F16H 57/0472* (2013.01)

(58) Field of Classification Search
CPC .... F16H 57/0472; F16H 57/029; F16H 57/08; F16J 15/3236; F16J 15/3232; F16N 2210/12
See application file for complete search history.

(56) References Cited

U.S. PATENT DOCUMENTS 5,429,374 A * 7/1995 Eichenberger ........... F16J 15/46 277/567
9,702,467 B2 * 7/2017 Cordua ................ F16J 15/0825
(Continued)

FOREIGN PATENT DOCUMENTS

CN 113167597 A 7/2021
DE 2119468 A 10/1972
(Continued)

*Primary Examiner* — Eugene G Byrd
(74) *Attorney, Agent, or Firm* — LEYDIG, VOIT & MAYER, LTD.

(57) ABSTRACT

An arrangement including two components with differential speed and an elastic oil transmission ring. One of the two components forms a groove for accommodating the oil transfer ring. The oil transfer ring has a U-shaped cross-section with a first lip and a second lip, wherein the first and second lips are spaced apart and run parallel to each other. The first and second lips each form a contact surface on their outer sides. The contact surfaces lie against two opposing wall surfaces of the groove when the oil transfer ring is mounted between the two components. The contact surfaces are spaced further apart than from each other than the two wall surfaces of the groove when the oil transfer ring is not mounted between the two components.

8 Claims, 4 Drawing Sheets

(56) References Cited

U.S. PATENT DOCUMENTS

2002/0035877 A1 3/2002 Tokumoto
2002/0053769 A1* 5/2002 Oiarbide Aseguinolaza ............... F16J 15/025 277/602
2005/0051387 A1 3/2005 Flamang et al.
2011/0247907 A1* 10/2011 Herges ................. F16J 15/3236 188/368
2014/0264137 A1* 9/2014 Linser .................. F16J 15/3208 251/359
2016/0334004 A1 11/2016 Leimann
2016/0347131 A1* 12/2016 Tsiberidis ............. F16C 41/005
2018/0328492 A1* 11/2018 Kustermans ......... F16J 15/3232
2019/0085979 A1* 3/2019 Mattoni ............... F16J 15/3284
2019/0085980 A1* 3/2019 Mattoni ............... F16J 15/3232
2020/0307682 A1 10/2020 Fujita
2020/0393046 A1* 12/2020 Szparagowski ...... F16J 15/3236
2021/0222508 A1* 7/2021 Pallini .................... F16J 15/028
2021/0254717 A1* 8/2021 Becker ................. F16J 15/3236
2022/0003305 A1 1/2022 Rottiers et al.
2022/0010875 A1* 1/2022 De Laet ................ F16H 57/046
2022/0260152 A1 8/2022 Riess et al.
2024/0101188 A1 3/2024 Wilson-Jones
2025/0076024 A1 3/2025 Uematsu et al.

FOREIGN PATENT DOCUMENTS

DE 19916106 A1 10/2000
DE 60307608 T2 10/2007
DE 102014200863 A1 7/2015
DE 102018218976 A1 5/2020
DE 102019209948 A1 1/2021
EP 1488139 B1 8/2006
JP S53115259 U 10/1978
JP S53165157 U 12/1978
JP 2007046727 A 2/2007
WO WO 2020094306 A1 5/2020
WO WO 2023223902 A1 11/2023

* cited by examiner 13
18
6
15
L
7
2
35
36
12
16
17
10
11
26
29
4
27
25
28
3
34
14
5
1
x
r

ASSEMBLY HAVING TWO COMPONENTS AND AN OIL TRANSFER RING

CROSS REFERENCE TO RELATED APPLICATIONS

This application is a U.S. National Phase application under 35 U.S.C. § 371 of International Application No. PCT/EP2022/078015, filed on Oct. 10, 2022, and claims benefit to German Patent Application No. DE 10 2021 212 743.6, filed on Nov. 12, 2021. The International Application was published in German on May 19, 2023 as WO 2023/083535 A1 under PCT Article 21(2).

FIELD

The invention relates to an arrangement with two components and an oil transfer ring, wherein the two components rotate at different speeds.

BACKGROUND

For lubrication and/or cooling of components in a rotation application such as in a planetary gearbox or concentric drive system, an oil transfer from stationary to rotating components is required. To ensure the desired oil flow and pressure, leakage between the rotating and static components should be limited.

In this context, EP 1 488 139 B1 shows a planetary stage of a gearbox with a rotating planet carrier and a stationary ring gear. The output of the planetary stage performed via a sun. Planets and planet bearings are mounted on planet shafts that rotate together with the planet carrier. A stationary pump feeds oil through stationary oil lines and oil conditioning elements (i.e. cooler, filter, etc.). A circular ring, e.g. made of polyamide, has a U-shaped profile and is mounted on a rear side of the planet carrier. This ring fits into a machined annular groove in the stationary housing. Since the ring is fixed relative to the rotating planet carrier, it therefore rotates relative to the stationary housing. The combination of the U-shaped ring and the annular groove in the housing forms a channel, through which oil can pass through holes in a locking plate of the planet carrier into cavities in the back of the planet shafts. From here, the oil moves through the holes in the planet shafts to the planet bearings. Due to the fact that the U-shaped ring does not fit perfectly into the milled groove in the housing, there is a certain amount of oil leakage and pressure drop.

SUMMARY

In an embodiment, the present disclosure provides an arrangement comprising two components with differential speed and an elastic oil transmission ring. One of the two components forms a groove for accommodating the oil transfer ring. The oil transfer ring has a U-shaped cross-section with a first lip and a second lip, wherein the first and second lips are spaced apart and run parallel to each other. The first and second lips each form a contact surface on their outer sides. The contact surfaces lie against two opposing wall surfaces of the groove when the oil transfer ring is mounted between the two components. The contact surfaces are spaced further apart than from each other than the two wall surfaces of the groove when the oil transfer ring is not mounted between the two components.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
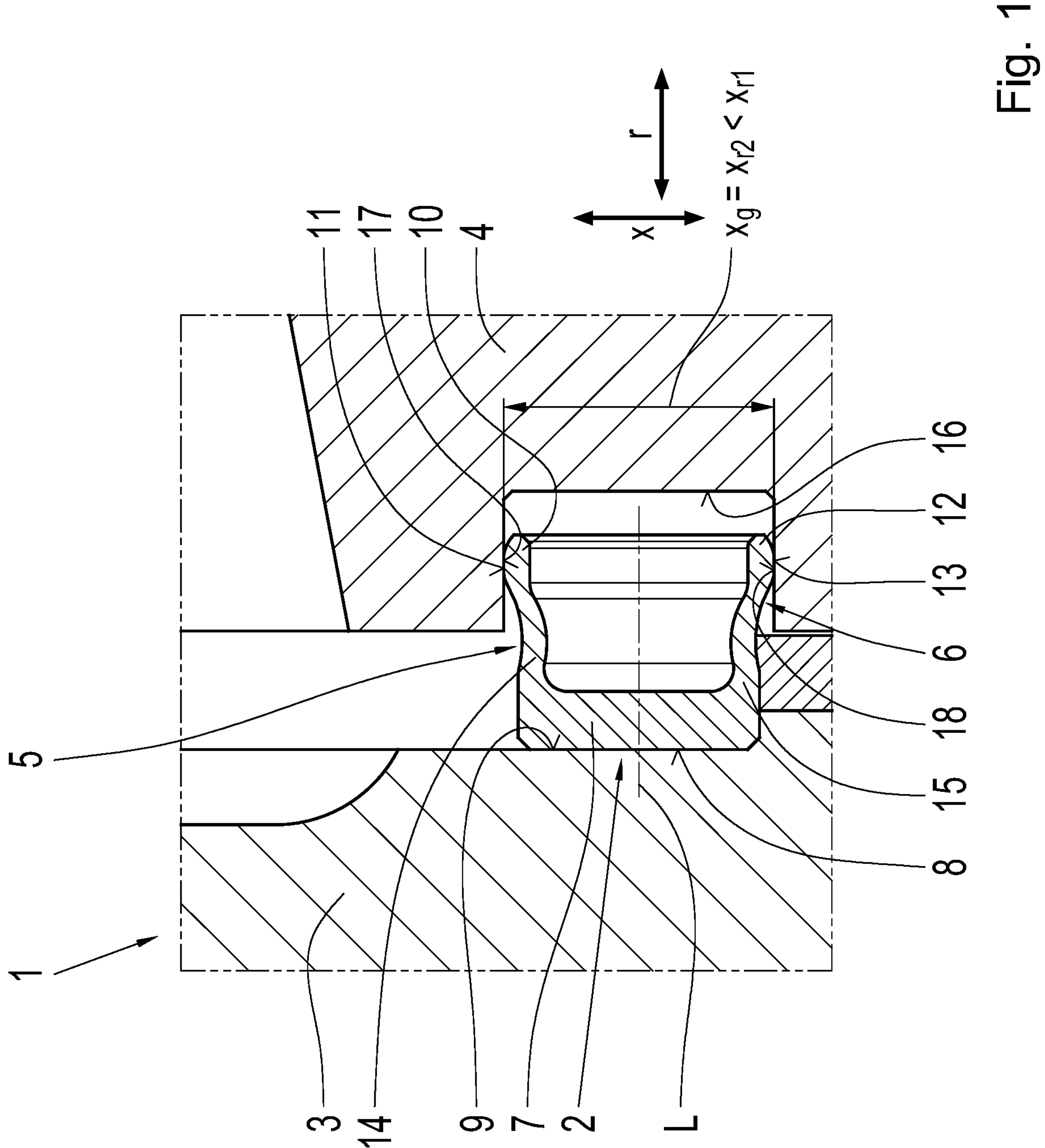
FIG. 1 illustrates a sectional view of an arrangement according to an exemplary embodiment of the invention comprising a rotating first component and a stationary second component with an oil transfer ring arranged between the two components.

In an embodiment, the present invention provides a seal between a rotating component and a stationary component, whereby oil leakage and pressure drop are reduced.

According to a first aspect of the invention, an arrangement is provided comprising two components and an oil transfer ring, wherein there is a differential speed between the two components. The two components can, for example, be a first component that rotates, whereas a second component does not rotate (stationary component; rotational speed=0). Furthermore, the two components can, for example, be two shafts that rotate at different speeds. The oil transfer ring is made of an elastic material, e.g. a polyamide material, which has different thermal expansion properties compared to steel or cast iron.

One of the two components forms a groove for receiving the oil transfer ring that has a U-shaped cross-section with two lips that are spaced apart and run parallel to each other. Thereby a longitudinal axis of the U-shaped cross-section of the oil transfer ring can run in a radial direction or in an axial direction of the two components. The lips each form a contact surface on their outer sides. In an assembled state of the oil transfer ring, i.e. when the oil transfer ring is mounted between the two components, the contact surfaces lie against two opposing wall surfaces of the groove. In this assembled state, the distance between the two contact surfaces corresponds to the distance between the two wall surfaces of the groove. In a disassembled state, however, i.e. when the oil transfer ring is not mounted between the two components, the contact surfaces are further apart from each other than the two wall surfaces of the groove.

The lips therefore have an oversize in the region of their contact surfaces relative to the wall surfaces of the groove. When the oil transfer ring with its lips is inserted into the groove, the elastic lips give way so that the contact surfaces fit snugly and sealingly against the wall surfaces of the groove. Due to the oversize in the region of their contact surfaces, the lips are thereby pre-stressed in such a way that the contact surfaces are pressed against the wall surfaces of the groove. In this way, a particularly effective and reliable seal can be achieved between the two components. Thanks to the oil transfer ring, the arrangement according to an embodiment of the invention ensures an oil pressure build-up over a wide range of operating conditions. A potential leakage path is reduced by the initial lip contact. The arrangement is less sensitive to external interference factors that reduce lip contact. Such disturbance factors can be, in particular, misalignment, deformation under load, thermal expansion or shape tolerances.

In an embodiment, the oil transfer ring comprises a first lip, a second lip and a base. The first lip and the second lip extend in a radial direction of the oil transfer ring, whereas the base extends in an axial direction of the oil transfer ring. The first lip has a first freely extending end region forming a first outer contact surface, and the second lip has a second freely extending end region forming a second outer contact surface. The first lip further comprises a first connecting end connected to the base, and the second lip comprises a second connecting end connected to the base. The base connects the first connecting end of the first lip to the second connecting end of the second lip such that the first lip, the second lip and the base together form the U-shaped cross-section of the oil transfer ring. Furthermore, the first outer contact surface is arranged offset outwardly in the axial direction relative to the first connecting end, and the second outer contact surface is arranged offset outwardly in the axial direction relative to the second connecting end.

The combination of the elastic material of the oil transfer ring and the outwardly offset arrangement of the outer contact surfaces enables that the lip contact is maintained, particularly at changing temperatures on the inside diameter of a groove against which the outer contact surfaces are to lie. This constant contact between the oil transfer ring and the groove helps to ensure a pressure build-up in the oil transfer ring and the downstream oil channels. These oil channels can lead to pressure-dependent consumers such as oil spray nozzles or slide bearings. The risk of ring wear is further reduced, since the offset allows the contact pressure on the ring lips to be controlled. The functional objective is to maintain lip contact in all operating conditions with acceptable contact pressure levels and stress levels. To make this possible, the cross-section profile is configured and/or designed flexibly in the manner described above to allow for deformations.

The cross-sectional profile of the oil transfer ring can be double-curved in the region of the lips. In this way a stress, caused by the deformation of the lip due to the contact pressure in the contact, is distributed over various radii. Thereby a considerable overlap (oversize) is enabled between the groove and the lip contact surfaces, resulting in acceptable pressures and stresses. In this sense, according to an embodiment, it is provided that the first lip and the second lip are double-curved along several radii, so that the outer contact surfaces are arranged offset outwardly in the axial direction relative to the connection ends.

In order to maintain the lip contact over a wide temperature range, the cross-sectional profile can be configured with a varying lip thickness. The lip profile on the U-ring base thereby has a greater thickness than the profile on the contact surface. In this sense, according to an embodiment it is provided that the lips are configured to be thinner in the region of their contact surfaces than in the region of their connecting ends.

Assembly-related boundaries and an increase in volume due to thermal expansion can lead to a tilting of the oil transfer ring. To solve this problem, it is provided to select the different cross-sectional thickness of the lips in such a way that the thermal expansion line maintains the initial lip contact. In this sense, in an embodiment, the material thicknesses of the lips in the region of their contact surfaces and in the region of their connecting ends are dimensioned and matched to each other in such a way that a thermal expansion line of the lips runs in such a way that the contact surfaces are pressed outwards, in particular when the oil transfer ring tilts due to an assembly-related boundary and a thermal expansion.

In an embodiment, the first lip and the second lip are identical parts, i.e. the first lip is configured identically to the second lip. As regards the arrangement of the two lips relative to each other, the lips are arranged symmetrically relative to one another, in particular relative to a longitudinal axis of the U-shaped cross-section of the oil transfer ring.

The oil transfer ring can further be formed such that multiple lubrication channels are created. In this sense, in an embodiment, the oil transfer ring comprises a third lip, wherein the third lip is arranged adjacent and parallel to the first lip or the second lip. The third lip has a third freely extending end region, which forms a third outer contact surface. Furthermore, the third lip has a third connecting end connected to the base. Thereby the third outer contact surface is arranged offset outwardly in the axial direction relative to the third connecting end.

The oil transfer ring can be mounted on a rotating component and can rotate in the concentric groove of a static component. To ensure pressure build-up in the oil transfer ring and the downstream oil channels, a contact between the oil transfer ring and the groove should be enabled. To reduce the risk of ring wear, the contact pressure on the ring lips should be checked. The functional objective is to maintain lip contact with acceptable contact pressure levels and stress levels in all operating conditions. Therefore, the oversized oil transfer ring described above is used, which, as described above, is configured to be flexible in particular to allow for deformations. In this sense, in an embodiment, the first component rotates, whereas the second component does not rotate (speed n=0). An inner surface of the base of the oil transfer ring thereby lies concentrically and non-rotatably against an outer surface of the first component, so that the oil transfer ring rotates together with the first component. The non-rotating second component forms the groove, which is arranged concentrically relative to the first component and the oil transfer ring. Thereby the first outer contact surface of the first lip of the oil transfer ring contacts the first wall surface of the groove of the non-rotating second component, which first wall surface extends parallel to a longitudinal axis of the U-shaped cross-section of the oil transfer ring, the second outer contact surface of the second lip of the oil transfer ring contacts the second wall surface of the groove of the non-rotating second component, which second wall surface extends parallel to the longitudinal axis of the U-shaped cross-section of the oil transfer ring.

Alternatively, the oil transfer ring can also be mounted on a stationary component. In this sense, according to an embodiment, it is provided that the first component rotates, whereas the second component does not rotate. An inner surface of the base of the oil transfer ring lies non-rotatably against an outer surface of the non-rotating second component, so that the oil transfer ring does not rotate when the first component rotates. The rotating first component forms the groove that is arranged concentrically to the second component and the oil transfer ring, wherein the first outer contact surface of the first lip of the oil transfer ring contacts the first wall surface of the groove of the rotating first component, which first wall surface extends parallel to the longitudinal axis of the U-shaped cross-section of the oil transfer ring, and wherein the second outer contact surface of the second lip of the oil transfer ring contacts the second wall surface of the groove of the rotating component, which second wall surface extends parallel to the longitudinal axis of the U-shaped cross-section of the oil transfer ring.

In the case of a concentric shaft structure, the rotating ring can be used between two rotating parts with different rotational speeds. In this sense, according to an embodiment it is provided that the first component comprises a first shaft rotating with a first speed and the second component comprises a second shaft concentrically arranged around the first shaft and rotating at a second speed differing from the first speed. One of the two shafts forms the groove for receiving the oil transfer ring, the oil transfer ring being arranged in the groove between the first shaft and the second shaft.

FIG. 1 shows an arrangement 1 comprising an oil transfer ring 2, a first rotating component 3 and a second non-rotating component 4, i.e. a stationary component. The oil transfer ring 2 is made of an elastic polyamide material and has a first lip 5, a second lip 6 and a base 7. The arrangement 1 can, for example, form part of a gearbox, e.g. a gearbox of a wind turbine.

The first lip 5 and the second lip 6 extend and/or run in a radial direction r of the oil transfer ring 2, whereas the base 7 extends in an axial direction x of the oil transfer ring 2. An inner surface 8 of the base 7 of the oil transfer ring 2 lies concentrically and non-rotatably against an outer surface 9 of the rotating component 3, so that the oil transfer ring 2 rotates together with the rotating component 3. Due to the concentric arrangement of the oil transfer ring 2 on the rotating component 3, the axial direction x of the oil transfer ring 2 corresponds to the axial direction of the rotating component 3 in the exemplary embodiment shown. The same applies to the radial direction r.

The first lip 5 has a first freely extending end region 10 that forms a first outer contact surface 11. The second lip 6 has a second freely extending end region 12 that forms a second outer contact surface 13. The first lip 5 also has a first connecting end 14 connected to the base 7 and the second lip 6 has a second connecting end 15 connected to the base 7. The base 7 forms one piece with both the first connecting end 14 of the first lip 5 and the second connecting end 15 of the second lip 6, so that the first lip 5, the second lip 6 and the base 7 together form a U-shaped cross-section of the oil transfer ring 2. The first outer contact surface 11 is further arranged offset outwardly in the axial direction x of the oil transfer ring 2 relative to the first connecting end 14, and the second outer contact surface 13 is arranged offset outwardly in the axial direction x of the oil transfer ring 2 relative to the second connecting end 15. In the exemplary embodiment shown, the first lip 5 is shaped identically to the second lip 6. Furthermore, the two lips 5, 6 are arranged symmetrically to each other relative to a longitudinal axis L of the U-shaped cross-section of the oil transfer ring 2. The longitudinal axis L extends in the radial direction r of the oil transfer ring 2. The base 7 has at least one opening, which enables a fluid connection between the first component 3 and the second component 4. Due to the cross-sectional view in FIG. 1, however, this opening cannot be seen.

The non-rotating component 4 forms a groove 16. The groove 16 extends concentrically to the rotating component 3 and to the oil transfer ring 2. The groove 16 forms a first wall surface 17 that extends parallel to the longitudinal axis L of the U-shaped cross-section of the oil transfer ring 2. Furthermore, the groove 16 forms a second wall surface 18 that also extends parallel to the longitudinal axis L of the U-shaped cross-section of the oil transfer ring 2. The first outer contact surface 11 of the first lip 5 of the oil transfer ring 2 contacts the first wall surface 17 and the second outer contact surface 13 of the second lip 6 of the oil transfer ring 2 contacts the second wall surface 18.

In the assembled state of the oil transfer ring 2 shown in FIG. 1, according to which the oil transfer ring 2 is mounted between the two components 3, 4, the contact surfaces 11, 13 lie against the two opposing wall surfaces 17, 18 of the groove 16. In this assembled state, a distance $x_{r2}$ between the two contact surfaces 11, 13 corresponds to a distance $x_g$ between the two wall surfaces 17, 18 of the groove 16. In the disassembled state shown in FIG. 2, however, i.e. when the oil transfer ring 2 is not mounted between the two components 3, 4, the contact surfaces 11, 13 are spaced further apart (distance of the contact surfaces in the disassembled state $x_{r1}$) than the two wall surfaces 17, 18 of the groove 16 (see FIG. 1; $x_g < x_{r1}$). The elastic lips 5, 6 therefore have an oversize in the region of their contact surfaces 11, 13 relative to the wall surfaces 17, 18 of the groove 16. When the oil transfer ring 2 with its lips 5, 6 is inserted into the groove 16 (FIG. 1), the elastic lips 5, 6 give way so that the contact surfaces 11, 13 lie snugly and sealingly against the wall surfaces 17, 18 of the groove 16. Due to the oversize in the region of their contact surfaces 11, 13, the lips 5, 6 are thereby pre-stressed in such a way that the contact surfaces 11, 13 are pressed against the wall surfaces 17, 18 of the groove 16.

Figure 2:
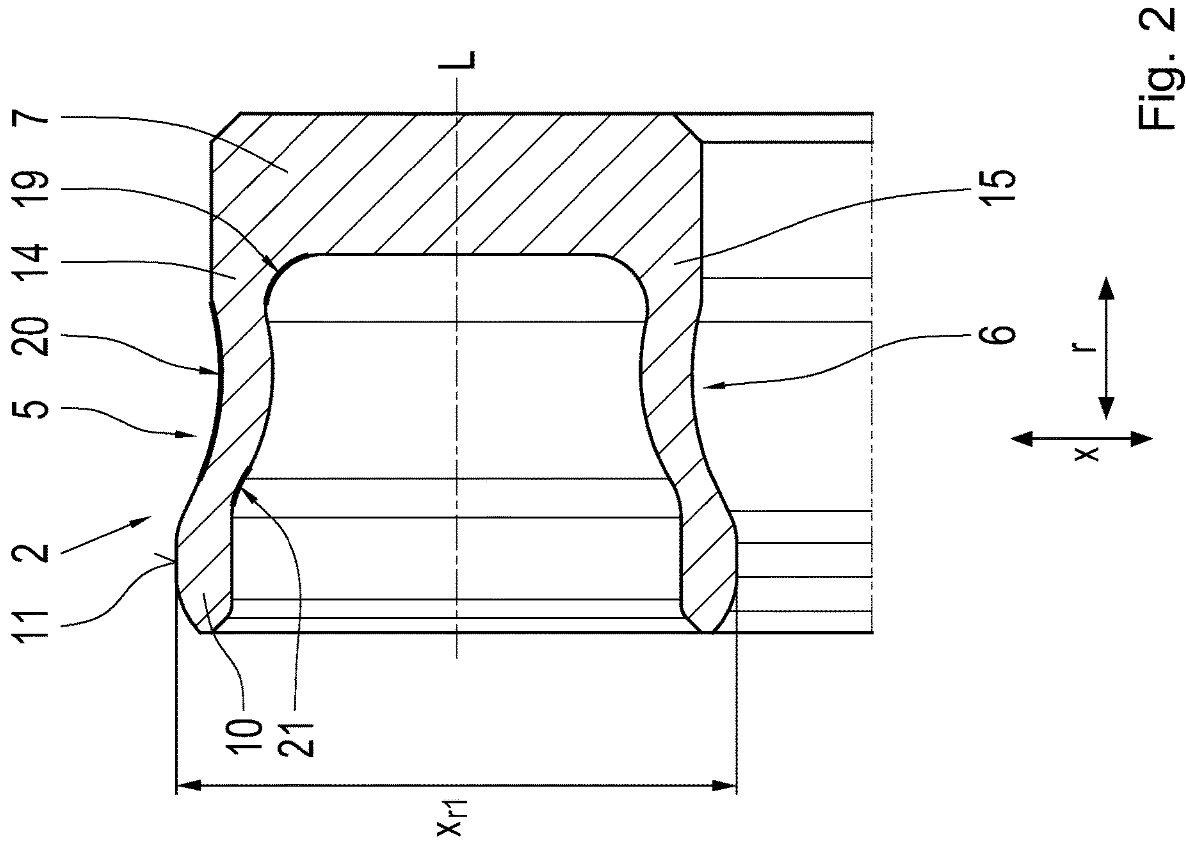
FIG. 2 illustrates a sectional view of an exemplary embodiment of an oil transfer ring with double-curved lip profile for the arrangement shown in FIG. 1.

In particular, FIG. 2 shows that the U-shaped cross-sectional profile of the oil transfer ring 2 can be double-curved due to different radii. The two lips 5, 6 shown in FIG. 2 are arranged symmetrically to each other relative to a longitudinal axis L of the U-shaped cross-section of the oil transfer ring 2. In FIG. 2, a first radius 19, a second radius 20 and a third radius 21 are provided with a reference number. The first radius 19 is located in the region of the first connecting end 14 of the first lip 5. The first radius 19 ensures a smooth transition between the base 7 that extends essentially in the axial direction x and the connecting end 14 of the first lip 5, which extends essentially in the radial direction r. The second radius 20 and the third radius 21 provide a stress-optimized transition between the connecting end 14 of the first lip 5 and the freely extending end 10 of the first lip 5, which is offset transversely to the longitudinal axis L. In this way, the first outer contact surface 11 is arranged offset outwardly in the axial direction x relative to the first connecting end 14, wherein there is a considerable overlap of the lip contact in the axial direction x, which in turn leads to acceptable pressures and stresses. In other words, the double-curved profile of the lips 5,6 shown in FIG. 2 distributes the stress caused by the deformation of the lip due to the contact pressure p acting on the first contact surface 11 over different radii 19, 20, 21.

Figure 3:
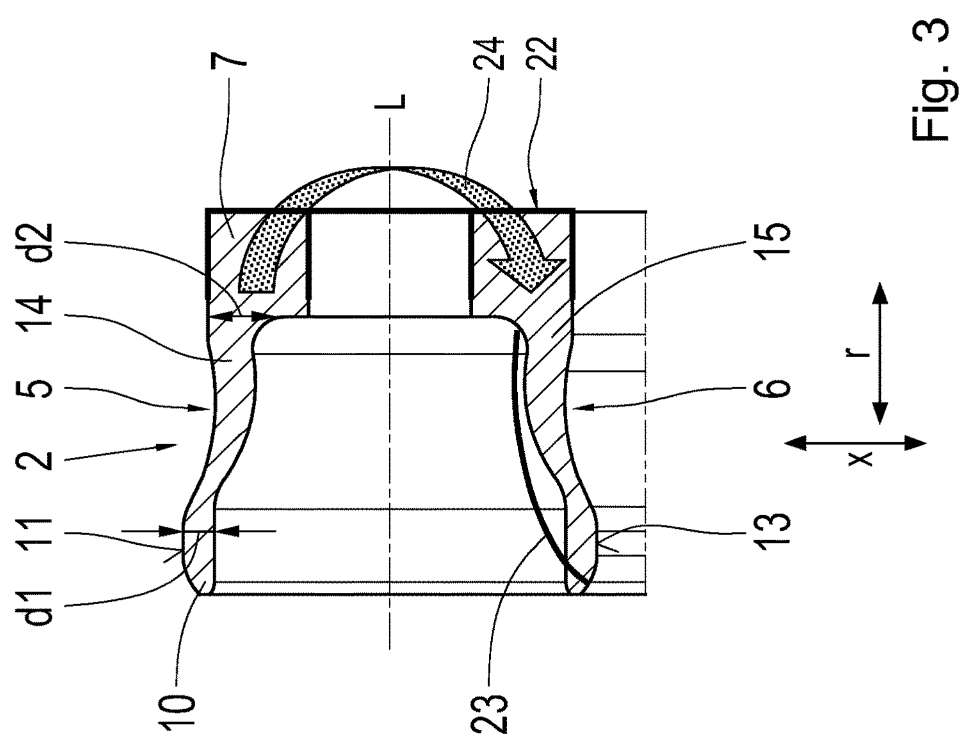
FIG. 3 illustrates a sectional view of an exemplary embodiment of an oil transfer ring with varying thickness profile of lips of the oil transfer ring for the arrangement according to FIG. 1.

In order to maintain lip contact over a wide temperature range, the cross-sectional profile can be configured with a varying thickness, as shown in FIG. 3. The lip profile on the U-ring base 7 thereby has a greater thickness than the profile of the contact surface 11. The two lips 5, 6 shown in FIG. 3 are arranged symmetrically to each other relative to the longitudinal axis L of the U-shaped cross-section of the oil transfer ring 2. In detail, the first lip 5 has a first thickness d1 and/or material thickness in the region of the first freely extending end 10 and thus also in the region of the first outer contact surface 11. In the region of its first connecting end 14, the first lip has a second thickness d2, wherein the second thickness d2 is greater than the first thickness d1. Assembly-related boundaries (illustrated in FIG. 3 at the right-hand boundary of the oil transfer ring 2 with a thicker line 22) and an increase in volume due to thermal expansion lead to a tilting 24 of the oil transfer ring 2. The different cross-sectional thickness d1, d2 is selected in the exemplary embodiment shown in FIG. 3 in such a way that a thermal expansion line 23 maintains the initial lip contact in the contact surfaces 11, 13, as shown in FIG. 3.

Figure 4:
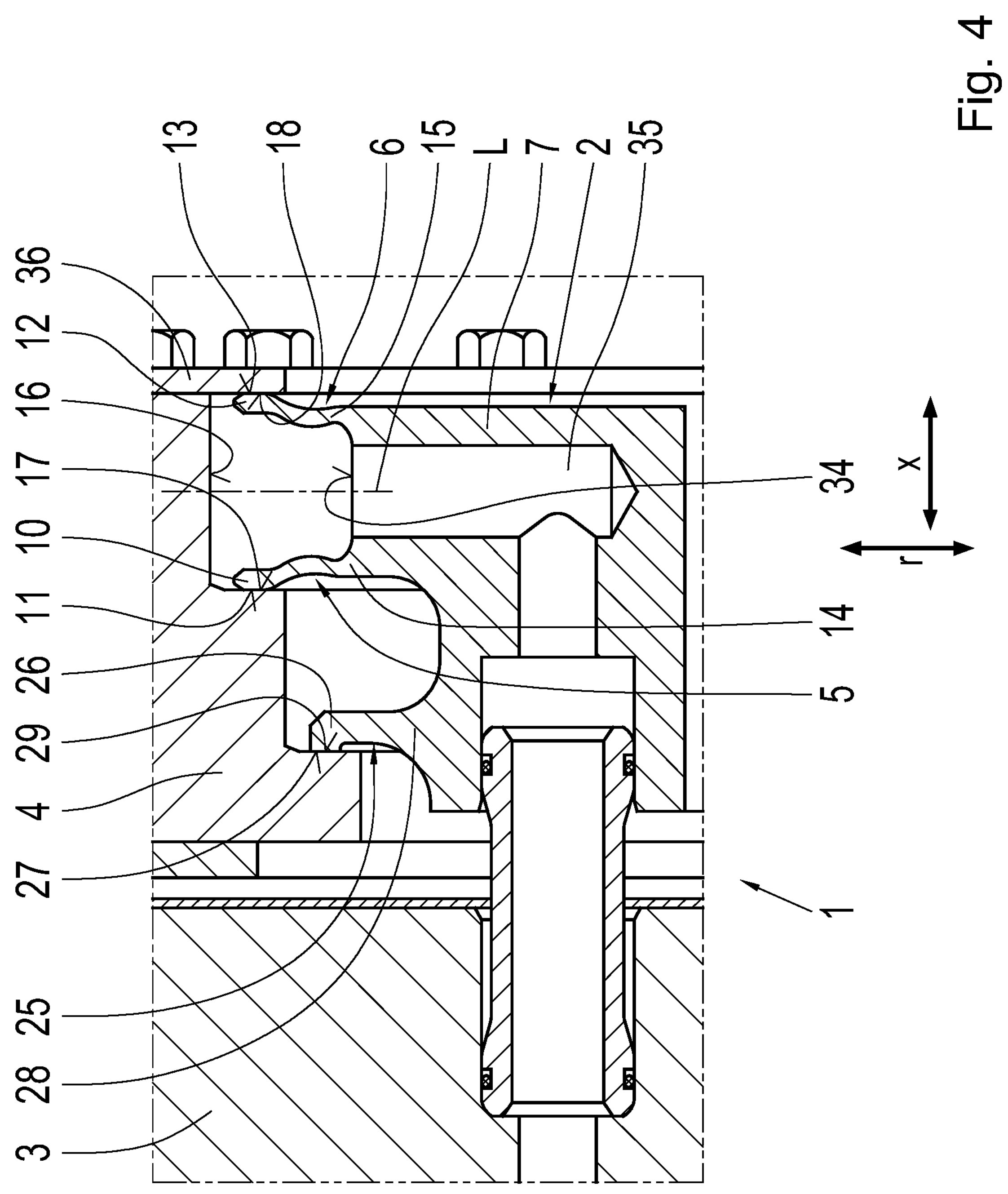
FIG. 4 illustrates a sectional view of an arrangement according an exemplary embodiment of the invention comprising a rotating first component and a stationary second component with an oil transfer ring arranged between the two components, which has three lips.

FIG. 4 shows a further arrangement 1 comprising an oil transfer ring 2, a first rotating component 3 and a second non-rotating, i.e. stationary, component 4. The oil transfer ring 2 is made of an elastic polyamide material and has a first lip 5, a second lip 6 and a base 7. The arrangement 1 can, for example, form part of a gearbox, e.g. a gearbox of a wind turbine.

The first lip 5 and the second lip 6 extend and/or run in a radial direction r of the oil transfer ring 2, whereas the base 7 extends in an axial direction x of the oil transfer ring 2. A surface of the base 7 extending in the radial direction r is non-rotatably arranged on the rotating component 3 (e.g. by means of a driving pin), so that the oil transfer ring 2 rotates together with the rotating component 3 about an axis of rotation extending in the axial direction. In contrast to the exemplary embodiment according to FIG. 1, the oil transfer ring 2 according to FIG. 3 is configured in the radial direction r in order to enable displacement in the radial direction r.

The first lip 5 has a first freely extending end region 10 that forms a first outer contact surface 11. The second lip 6 has a second freely extending end region 12 that forms a second outer contact surface 13. The first lip 5 also has a first connecting end 14 connected to the base 7, and the second lip 6 has a second connecting end 15 connected to the base 7. The base 7 is thereby formed in one piece with both the first connecting end 14 of the first lip 5 and the second connecting end 15 of the second lip 6, so that the first lip 5, the second lip 6 and the base 7 together form a U-shaped cross-section of the oil transfer ring 2. Furthermore, the first outer contact surface 11 is arranged offset outwardly in the axial direction x of the oil transfer ring 2 relative to the first connecting end 14 and the second outer contact surface 13 is arranged offset outwardly in the axial direction x of the oil transfer ring 2 relative to the second connecting end 15. The first lip 5 is shaped identically to the second lip 6 as shown in the exemplary embodiment. Furthermore, the two lips 5, 6 are arranged symmetrically to each other relative to a longitudinal axis L of the U-shaped cross-section of the oil transfer ring 2. The longitudinal axis L extends in the radial direction r of the oil transfer ring 2. The base 7 has an opening that enables a fluid connection between the first component 3 and the second component 4 via a fluid channel. The non-rotating component 4 has a plate 36 that is screwed to the second non-rotating component 4 and secures the oil transfer ring 2 in the axial direction x.

The non-rotating component 4 forms a groove 16. The groove 16 extends concentrically to the oil transfer ring 2. The groove 16 forms a first wall surface 17 that extends parallel to the longitudinal axis L of the U-shaped cross-section of the oil transfer ring 2. Furthermore, the groove 16 forms a second wall surface 18 that also extends parallel to the longitudinal axis L of the U-shaped cross-section of the oil transfer ring 2. The first outer contact surface 11 of the first lip 5 of the oil transfer ring 2 contacts the first wall surface 17 and the second outer contact surface 13 of the second lip 6 of the oil transfer ring 2 contacts the second wall surface 18.

The oil transfer ring according to FIG. 4 further comprises a third lip 25 that is arranged adjacent and parallel to the first lip 5. The third lip 25 has a third freely extending end region 26 that forms a third outer contact surface 27. The third lip 25 further has a third connecting end 28 connected to the base 7, so that the three lips 5, 6, 25 together with the base 7 form a double U-profile in cross-section. The third outer contact surface 27 is thereby offset outwardly in the axial direction x relative to the third connecting end 28. The groove 16 forms a third wall surface 29 that extends parallel to the longitudinal axis L of the U-shaped cross-section of the oil transfer ring 2. The third outer contact surface 27 of the third lip 25 of the oil transfer ring 2 contacts the third wall surface 29 of the groove 16. The oil transfer ring 2 thereby has an oversize in the region of the first lip 5, the second lip 6 and the third lip 25, as described in connection with FIGS. 1 and 2, so that the contact surfaces 11, 13, 27 are pressed against the non-rotating component 4 in the assembled state.

Figure 5:
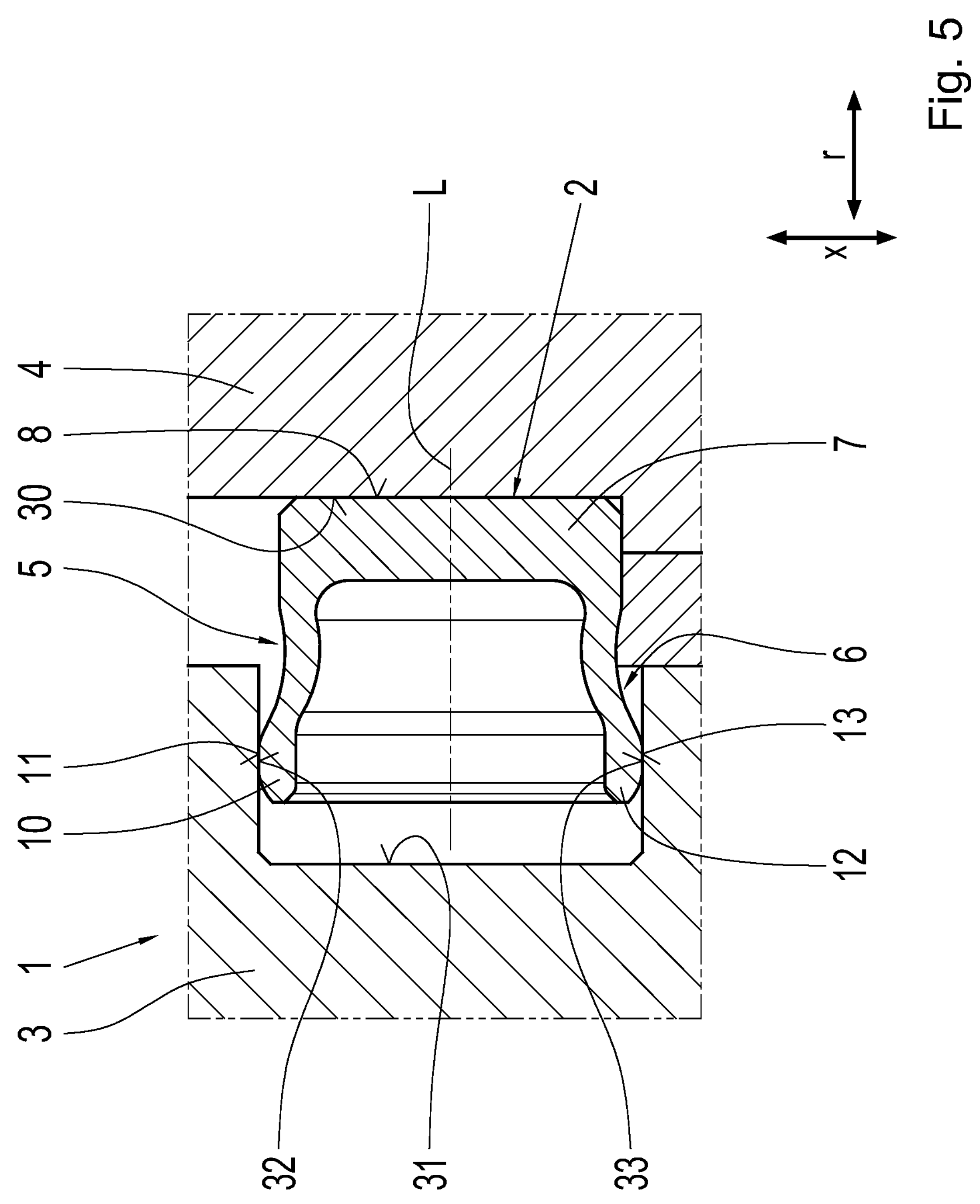
FIG. 5 illustrates a sectional view of an arrangement according to an exemplary embodiment of the invention comprising two components with differential speed, whereby an oil transfer ring is arranged between the two components.

In the exemplary embodiment of the arrangement 1 according to FIG. 5, the oil transfer ring 2 is mounted on the second non-rotating component 4, i.e. on the stationary component 4, instead of on the first rotating component 3. In this case, an inner surface 8 of the base 7 of the oil transfer ring 2 lies non-rotatably against an outer surface 30 of the second component 4, so that the oil transfer ring 2 does not rotate when the first component 3 rotates. The rotating first component 3 forms a groove 31, in which the lips 5, 6 (also oversized as described in connection with FIGS. 1, 2) are accommodated with their outer contact surfaces 11, 13. The groove 31 extends concentrically relative to the non-rotating component 4. The groove 31 forms a first wall surface 32 that extends parallel to the longitudinal axis L of the U-shaped cross-section of the oil transfer ring 2. Furthermore, the groove 31 forms a second wall surface 33 that also extends parallel to the longitudinal axis L of the U-shaped cross-section of the oil transfer ring 2. The first outer contact surface 11 of the first lip 5 of the oil transfer ring 2 contacts the first wall surface 32 and the second outer contact surface 13 of the second lip 6 of the oil transfer ring 2 contacts the second wall surface 33. Alternatively, the first component 3 according to FIG. 5 can be a first shaft that rotates at a first speed, wherein the second component 4 is a second shaft that rotates at a second speed different from the first speed. Thereby the second shaft 4 can, for example, concentrically surround the first shaft 3, wherein the oil transfer ring 2 is arranged between the first shaft 3 and the second shaft 4.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMBERS d1 first thickness
d2 second thickness
L longitudinal axis U-shaped cross-section oil transfer ring
p contact pressure
r radial direction
x axial direction
$x_{r\text{-}1}$ distance contact surfaces (assembled state)
$x_{r\text{-}2}$ distance contact surfaces (disassembled state)
$x_g$ distance wall surfaces
1 arrangement
2 oil transfer ring
3 first component
4 second component
5 first lip
6 second lip
7 base
8 inner surface base
9 outer surface first component
10 first freely extending end region
11 first outer contact surface
12 second freely extending end region
13 second outer contact surface
14 first connecting end
15 second connecting end
16 groove second component
17 first wall surface groove
18 second wall surface groove
19 first radius
20 second radius
21 third radius
22 assembly-related boundary
23 thermal expansion line lip
24 tilting
25 third lip
26 third freely extending end region
27 third outer contact surface
28 third connecting end
29 third wall surface groove
30 outer surface second component
31 groove first component
32 first wall surface groove
33 second wall surface groove
34 opening
35 fluid channel
36 plate

The invention claimed is:

1. An arrangement comprising: two components with differential rotational speed; and an elastic oil transfer ring, wherein: one of the two components forms a groove for accommodating the elastic oil transfer ring, the elastic oil transfer ring has a U-shaped cross-section with a first lip and a second lip, wherein the first and second lips are spaced apart and run parallel to each other, the first and second lips each form a contact surface on their outer sides, the contact surfaces lie against two opposing wall surfaces of the groove when the elastic oil transfer ring is mounted between the two components, and the contact surfaces are spaced further apart than from each other than the two wall surfaces of the groove when the elastic oil transfer ring is not mounted between the two components, wherein the elastic oil transfer ring further comprises a base, and wherein: the first lip and the second lip extend in a radial direction of the elastic oil transfer ring, the base extends in an axial direction of the elastic oil transfer ring, the first lip has a first freely extending end region that forms a first outer contact surface, the second lip has a second freely extending end region that forms a second outer contact surface, the first lip has a first connecting end connected with the base, the second lip has a second connecting end connected with the base, the base connects the first connecting end of the first lip to the second connecting end of the second lip such that the first lip, the second lip and the base together form the U-shaped cross-section of the elastic oil transfer ring, the first outer contact surface is arranged offset outwardly in the axial direction relative to the first connecting end, and the second outer contact surface is arranged offset outwardly in the axial direction relative to the second connecting end, and wherein the first lip and the second lip are double-curved along various radii so that the first and second outer contact surfaces are arranged offset outwardly in the axial direction relative to the first and second connecting ends.

2. The arrangement according to claim 1, wherein the first and second lips are thinner in a region of their respective contact surfaces than in a region of their respective connecting ends.

3. The arrangement according to claim 2, wherein respective material thicknesses of the first and second lips in the region of their respective contact surfaces and in the region of their respective connecting ends are dimensioned and matched to one another such that a thermal expansion line of the first and second lips extends and the first and second contact surfaces are pressed outwardly.

4. The arrangement according to claim 1, wherein the first lip and the second lip are identical parts that are arranged symmetrically to each other.

5. The arrangement according to claim 1, wherein the elastic oil transfer ring comprises a third lip, and wherein:
- the third lip is arranged adjacent to and parallel to the first lip or the second lip,
- the third lip has a third freely extending end region that forms a third outer contact surface,
- the third lip has a third connecting end connected to the base, and
- the third outer contact surface is arranged offset outwardly in the axial direction relative to the third connecting end.

6. The arrangement according to claim 1, wherein:
- a first component of the two components rotates,
- a second component of the two components does not rotate,
- an inner surface of the base of the elastic oil transfer ring lies concentrically and non-rotatably against an outer surface of a first component of the two components so that the elastic oil transfer ring rotates together with the first component, a non-rotating second component of the two components forms the groove that is arranged concentrically relative to the first component and the elastic oil transfer ring, the first outer contact surface of the first lip of the elastic oil transfer ring contacts a first wall surface of the two opposing wall surfaces of the groove of the non-rotating second component, which first wall surface extends parallel to a longitudinal axis of the U-shaped cross-section of the elastic oil transfer ring, and the second outer contact surface of the second lip of the elastic oil transfer ring contacts a second wall surface of the two opposing wall surfaces of the groove of the non-rotating second component, which second wall surface extends parallel to the longitudinal axis of the U-shaped cross-section of the elastic oil transfer ring.

7. The arrangement according to claim 1, wherein:

a first component of the two components rotates, a second component of the two components does not rotate, an inner surface of the base of the elastic oil transfer ring lies non-rotatably against an outer surface of the second component, so that the elastic oil transfer ring does not rotate when the first component rotates, the first component forms the groove that is arranged concentrically relative to the second component and the elastic oil transfer ring, the first outer contact surface of the first lip of the elastic oil transfer ring contacts a first wall surface of the two opposing wall surfaces of the groove of the first component, which first walls surface extends parallel to a longitudinal axis of the U-shaped cross-section of the elastic oil transfer ring, and the second outer contact surface of the second lip of the elastic oil transfer ring contacts a second wall surface of the two opposing wall surfaces of the groove of the first component, which second wall surface extends parallel to the longitudinal axis of the U-shaped cross-section of the elastic oil transfer ring.

8. The arrangement according to claim 1, wherein:

a first component of the two components comprises a first shaft that rotates at a first speed, a second component of the two components comprises a second shaft that rotates at a second speed different from the first speed, the second shaft concentrically surrounds the first shaft, one of the first shaft and the second shaft forms the groove for receiving the elastic oil transfer ring, and the elastic oil transfer ring is arranged in the groove between the first shaft and the second shaft.

* * * * *